US008833048B2

(12) United States Patent
Honey et al.

(10) Patent No.: US 8,833,048 B2
(45) Date of Patent: Sep. 16, 2014

(54) HARVESTING HEADER BAT WITH ADJUSTABLY SPACED QUICK RELEASE FINGERS

(71) Applicant: Honey Bee Manufacturing Ltd., Frontier (CA)

(72) Inventors: Glenn Honey, Frontier (CA); Nelson Cherry, Frontier (CA)

(73) Assignee: Honey Bee Manufacturing, Ltd., Frontier (CA)

( * ) Notice: Subject to any disclaimer, the term of this patent is extended or adjusted under 35 U.S.C. 154(b) by 0 days.

(21) Appl. No.: 13/766,883

(22) Filed: Feb. 14, 2013

(65) Prior Publication Data

US 2014/0223876 A1    Aug. 14, 2014

(51) Int. Cl.
*A01D 57/00*        (2006.01)
*A01D 57/12*        (2006.01)

(52) U.S. Cl.
CPC .................................. *A01D 57/12* (2013.01)
USPC ........................................................ 56/220

(58) Field of Classification Search
USPC ................. 56/14.4, 16.1, 220, 227, 364, 400, 56/400.21, DIG. 20
See application file for complete search history.

(56) References Cited

U.S. PATENT DOCUMENTS

| 12,750 | A | * | 4/1855 | Chatfield | 56/400.01 |
| 524,215 | A | * | 8/1894 | Quigley | 56/400.16 |
| 1,370,352 | A | * | 3/1921 | Parmley | 56/294 |
| 2,413,072 | A | * | 12/1946 | Sage | 56/222 |
| 3,468,109 | A | * | 9/1969 | Reimer | 56/220 |
| 3,935,697 | A | * | 2/1976 | Hofer | 56/400 |
| 4,189,907 | A | * | 2/1980 | Erdman | 56/400 |
| 4,901,511 | A | * | 2/1990 | Yarmashev et al. | 56/220 |
| 6,199,357 | B1 | * | 3/2001 | Bloom | 56/220 |
| 7,124,564 | B2 | * | 10/2006 | Glazik et al. | 56/220 |

* cited by examiner

*Primary Examiner* — Thomas B Will
*Assistant Examiner* — Mai Nguyen
(74) *Attorney, Agent, or Firm* — Nifong, Kiefer, and Klinck, PLLC

(57) ABSTRACT

A harvesting header bat having a channel for removably receiving alternating quick-release fingers and spacers is provided. The spacers are capable of production in different lengths to support different applications of the harvesting header. The quick-release finger is provided with projections configured for mating with flanges at the channel opening, enabling the finger to be inserted into the channel in a first orientation and then rotated into a second orientation to engage the flanges and releasably lock the finger in place. The spacers are also configured to engage the flanges of the channel and may be provided in different lengths where a particular harvesting header application requires a certain distance between fingers on the bat.

18 Claims, 3 Drawing Sheets

HARVESTING HEADER BAT WITH ADJUSTABLY SPACED QUICK RELEASE FINGERS

FIELD OF THE INVENTION

The invention relates to agricultural implements for harvesting crops, and more particularly to harvesting headers having bats with replaceable fingers.

BACKGROUND OF THE INVENTION

It is known in the field of crop harvesting equipment to employ harvesting headers to cut standing crops for various purposes, such as feeding a combine harvester or swathing crop material. Such harvesting headers commonly comprise a forwardly disposed cutter bar assembly for cutting the crop material, a draper deck or auger assembly rearward of the cutter bar assembly for transporting the cut crop material to a desired location (e.g. the intake for a combine harvester), and a generally cylindrical reel assembly parallel to the length of the cutter bar assembly for controlling the movement of cut crop against the cutter bar assembly and onto the draper deck assembly or into an auger assembly. The reel comprises a central rotatable shaft and a plurality of bats at a set distance from the central shaft, spaced apart from each other, each of the bats containing fingers or other members for engaging and guiding the crop material. The fingers may be composed of any suitable material given the particular crop and application, such as steel or molded plastic. In operation, the implement is driven into the standing crop, with the cutter bar assembly and reel assembly at the leading edge of the implement. After the cutter bar assembly cuts the crop material, the crop material falls and/or is moved rearwardly with the assistance of the reel assembly onto the generally horizontal draper deck assembly or horizontal auger assembly and then transported perpendicular to the direction of travel by the draper deck assembly or auger assembly and deposited either on the ground or at an intake for subsequent processing. Such an arrangement has many known benefits and has achieved wide acceptance and use.

However, a long-standing problem with conventional reel assemblies is that the fingers are commonly thin and provided with little structural support and accordingly are subject to significant wear and even breakage. It is costly and time-consuming to repair such damage in a conventional arrangement, particularly where fingers are welded or otherwise attached to the bat in a like manner.

There have been some attempts in the past to address this problem. For example, it is known in the art to releasably mount the fingers on the bat, to enable a less expensive and time-consuming repair solution. Fingers have been designed to bolt onto a bat, for example, and this has gained some popularity among implement users. U.S. Pat. No. 6,324,823 teaches a finger that attaches to a mounting collar, which collar is in turn bolted to the bat, and the collar can be unbolted and the finger repaired or replaced.

Alternative prior art solutions include the use of molded plastic fingers that can releasably engage a bat. For example, U.S. Pat. No. 4,776,155 teaches a bat formed using sheet metal, the bat provided with spaced apart holes for receiving the mounting ends of fingers. The fingers themselves are molded plastic and provided with a button at the base to mate with a hole in the bat.

While various solutions have been proposed, there still remains a desire in the technical field for a bat-finger arrangement that is simple, reliable and easy to repair. Also, the prior art solutions fail to address another noted problem in the field, namely the need for different finger spacings for different crops or applications. For example, prior art bats are provided with holes for receiving bolts or finger buttons, with the obvious result of set spacings. What is required, therefore, is a bat that provides for both simple finger repair or replacement and varied finger spacings.

SUMMARY OF THE INVENTION

The present invention therefore seeks to provide a bat that incorporates a channel to removably receive alternating quick-release fingers and spacers, the spacers being capable of production in different lengths to support different applications of the harvesting header.

According to a first aspect of the present invention there is provided a bat for a harvesting header, the bat comprising an elongate channel extending substantially the length of the bat and configured to removably receive alternating crop-engaging fingers and spacers. The channel comprises spaced apart flanges extending toward each other across the channel. Each of the fingers is provided with projections configured for slip-fit mating with each of the flanges, such that the finger can be inserted between the flanges and into the channel in a first orientation and subsequently rotated into a second orientation to mate the projections and the flanges and thereby releasably lock the finger in the channel. Each of the spacers is also configured to engage the flanges of the channel and may be provided in different lengths to adjust the spacing between the fingers on the bat.

According to a second aspect of the present invention there is a provided a harvesting header comprising a frame and a reel assembly mounted on the frame, the reel assembly comprising a plurality of bats disposed about a central shaft, each of the plurality of bats comprising an elongate channel extending substantially the length of the bat and configured to removably receive alternating crop-engaging fingers and spacers. The channel comprises spaced apart flanges extending toward each other across the channel. Each of the fingers is provided with projections configured for slip-fit mating with each of the flanges, such that the finger can be inserted between the flanges and into the channel in a first orientation and subsequently rotated into a second orientation to mate the projections and the flanges and thereby releasably lock the finger in the channel. Each of the spacers is also configured to engage the flanges of the channel and may be provided in different lengths to adjust the spacing between the fingers on the bat.

In exemplary embodiments of the present invention, the finger is composed of a molded plastic of sufficient strength to be rotated into and out of the locking orientation without breaking. The bat comprises an elongate tube with is preferably composed of extruded aluminum.

A detailed description of an exemplary embodiment of the present invention is given in the following. It is to be understood, however, that the invention is not to be construed as being limited to this embodiment.

BRIEF DESCRIPTION OF THE DRAWINGS

In the accompanying drawings, which illustrate an exemplary embodiment of the present invention:

FIG. 2b is a rear elevation view of the quick release finger of FIG. 2a;

FIG. 3b is a side elevation view of the spacer of FIG. 3a;

FIG. 4b is a top plan view of the bat tube of FIG. 4a;

An exemplary embodiment of the present invention will now be described with reference to the accompanying drawings.

DETAILED DESCRIPTION OF EXEMPLARY EMBODIMENT

The present invention relates to a novel reel bat and associated fingers and spacers, and a header incorporating such a novel reel bat. Only those parts of the header as are necessary for description of the reel bat are discussed herein, and the remaining parts and functions of the header will not be discussed as they are conventional and well known to those skilled in the art.

Figure 1:
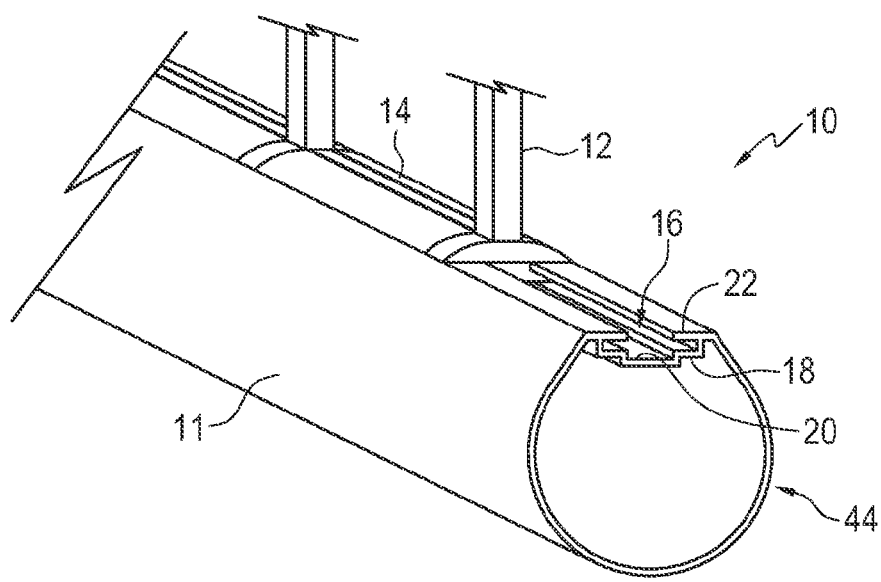
FIG. 1 is a perspective view of a header bat according to the present invention.

Turning to FIG. 1, a partial reel bat 10 is shown. The bat 10 comprises a tube 11 incorporating a channel 16, a plurality of fingers 12, and a plurality of spacers 14 alternating with the fingers 12. Only a portion of the bat 10 is illustrated, as the pattern of alternating fingers 12 and spacers 14 would preferably continue the length of the tube 11. The tube comprises a connector 18 and a slot 20 therein. The channel 16 is defined by the tube 11 walls and the connector 18, and it is open at an upper end. The upper opening of the channel 16 is bordered by flanges 22 which run the length of the channel 16 and extend toward each other but leave a gap therebetween. The open end 44 of the bat 10 would be mounted to a bat support arm (not shown) of a reel assembly (not shown) in a conventional manner well known to those skilled in the art. As would be obvious to those skilled in the art, each paired finger/spacer could be manufactured in a unitary design for insertion into the open end 44, but the exemplary embodiment will discuss them as separate elements with the fingers 12 rotatable within the channel 16 between insertion and locking orientations. The manner in which the fingers 12 and spacers 14 are locked into the channel 16 is discussed below.

Figure 2A:
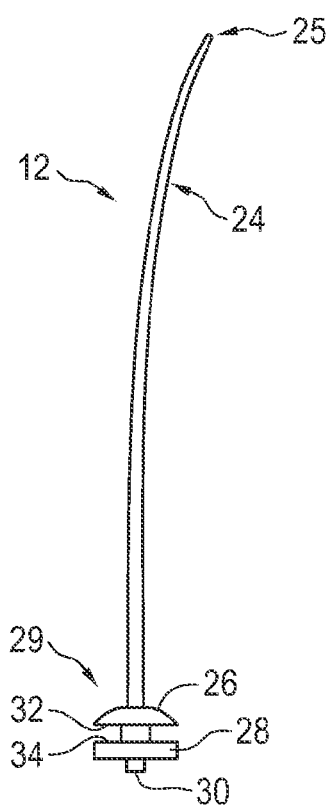
FIG. 2a is a side elevation view of a quick release finger according to the present invention.
Figure 2B:
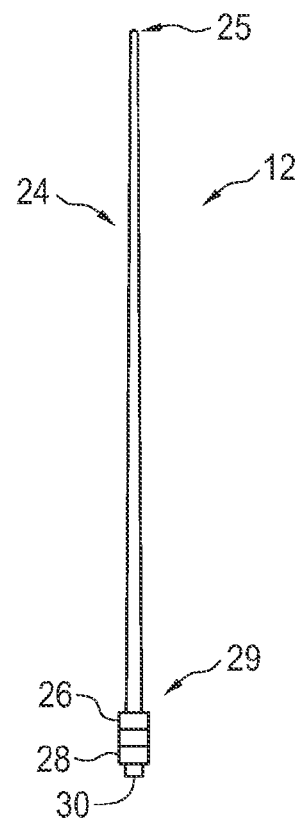

FIGS. 2a and 2b illustrate a finger 12 according to the present invention. The finger 12 comprises a curved portion 24 ending in a distal tip 25 and a connecting portion 29 at the opposite end of the finger 12. The connecting portion 29 comprises spaced apart upper and lower members 26, 28, with the gap between the upper and lower members 26, 28 defined by a lower surface 32 of the upper member 26 and an upper surface 34 of the lower member 28 and configured to accept the flanges 22 therebetween in a manner discussed below. The finger 12 also comprises a base 30 that is configured for retention in the slot 20 of the connector 18. The finger 12 is preferably composed of a molded plastic material of sufficient strength for the specific application and to be twisted into and out of locking orientation as discussed below.

Figure 3A:
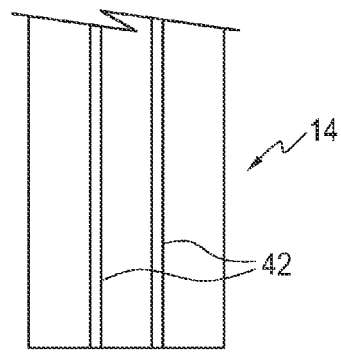
FIG. 3a is a top plan view of a spacer according to the present invention.
Figure 3B:
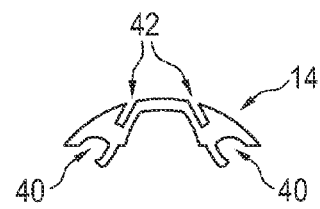

FIGS. 3a and 3b illustrate a spacer 14 according to the present invention. Like the finger 12, the spacer 14 is preferably composed of a molded plastic material. The spacer 14 is provided with grooves 40 at the edges for removably attaching to the flanges 22 of the tube 11, as can best be seen in FIGS. 3b and 6. The spacer 14 is also provided with notches 42 to assist in flexibility when attaching or detaching the spacer 14 from the flanges 22.

Figure 4A:
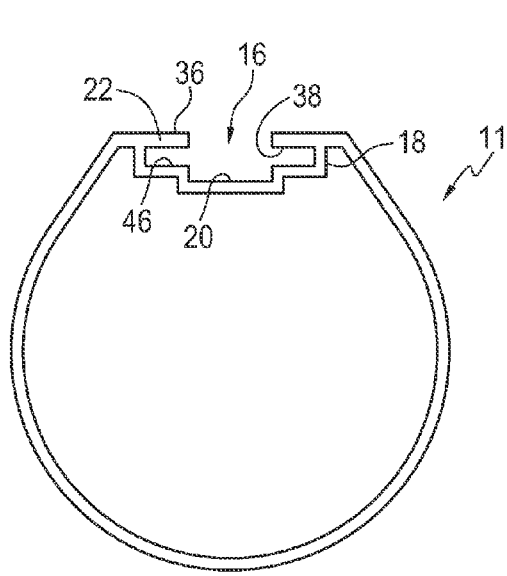
FIG. 4a is a side elevation view of a bat tube according to the present invention.
Figure 4B:
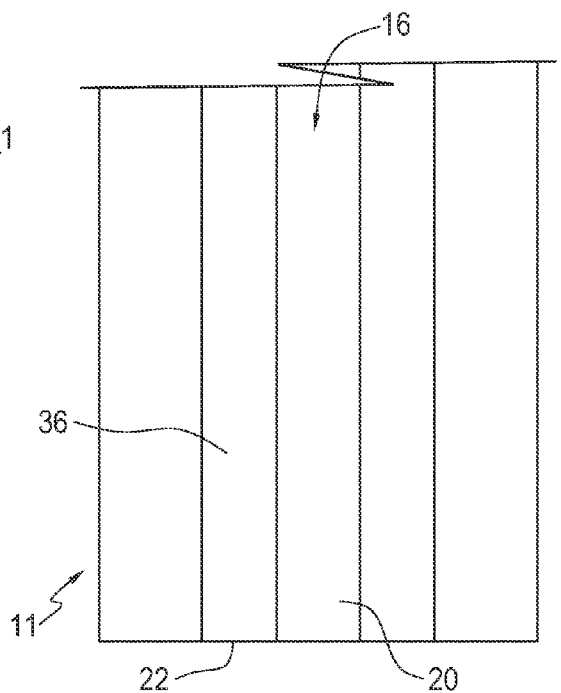

FIGS. 4a and 4b illustrate a tube 11 according to the present invention, and is shown in perspective view in FIG. 1. The tube 11 is preferably composed of extruded aluminum, but may be of any alternative suitable material known to those skilled in the art. The tube 11 comprises a connector 18 and spaced apart flanges 22, which collectively define a channel 16. The flanges 22 each comprise an upper surface 36. The connector 18 incorporates a slot 20, and the channel 16 is further defined by upper and lower surfaces 38, 46.

Figure 5A:
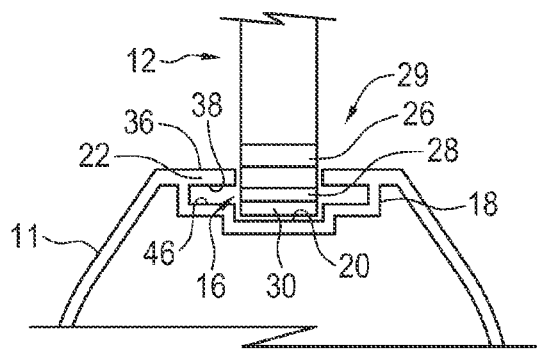
FIG. 5a is a side elevation view of a finger being positioned into the channel of the bat tube.
Figure 5B:
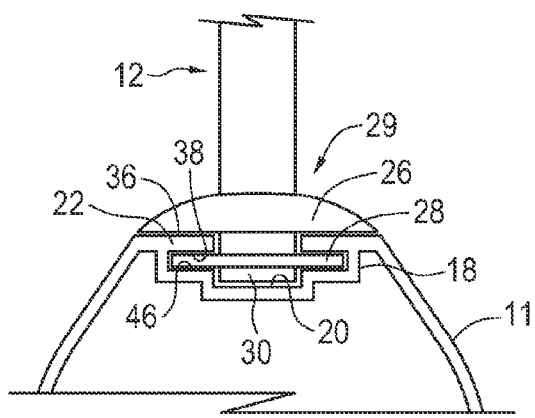
FIG. 5b is a side elevation view with the finger of FIG. 5a rotated to lock into place in the channel.
Figure 6:
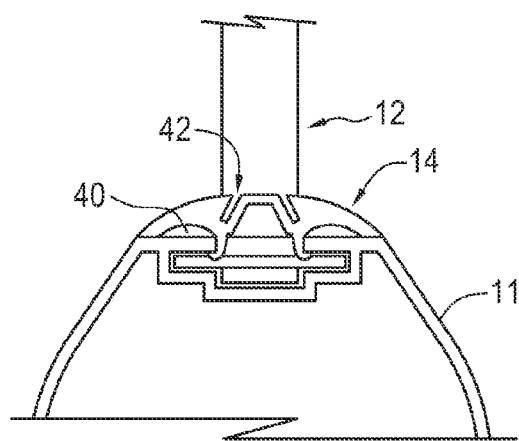
FIG. 6 is a side elevation view of a spacer in position in the channel of the bat tube.

Turning now to FIGS. 5a, 5b and 6, the attachment of a finger 12 and spacer 14 to a tube 11 is illustrated. To insert the finger 12 in the tube 11, the finger 12 is held in a first orientation as shown in FIG. 2b, with the protruding edges of the upper and lower members 26, 28 parallel to the long axis of the channel 16. The finger 12 is then lowered into the channel 16 until the base 30 is received in the slot 20. This is shown in FIG. 5a. Once the base 30 has been thus received, the finger 12 is then rotated 90 degrees to a second orientation, as shown in FIG. 5b, such that the lower member 28 rotates into the gap under the flanges 22 between the lower and upper surfaces 38, 46. The lower member 28 is thus held firmly between the lower and upper surfaces 38, 46, and the upper member 26 rests on the upper surface 36 of the flanges 22. Once rotated into the second orientation, the finger 12 is thus locked into the channel 16.

Once the finger 12 has been locked into the channel 16, a spacer 14 can be inserted into the channel 16, as is shown in FIG. 6. Referring to FIGS. 3b and 6, the spacer 14 is provided with grooves 40 that are configured to engage the inner edges of the flanges 22. The spacer 14 is provided with notches 42 to provide flexibility that may aid in the insertion of the spacer 14. The spacer 14 can either be inserted from above the channel 16 or from the open end 44 of the tube 11 and slid into position against the finger 12. The spacer 14 can be manufactured at any desired length, depending on the optimal or desired finger 12 spacing for the particular implement or application. Once the spacer 14 is in position against the finger 12, another finger can be inserted, followed by another spacer, and continuing until the channel 16 of the tube 11 has been filled.

If a finger becomes worn or otherwise damaged, the tube can be easily removed from implement, fingers and spacers can be removed from the channel to arrive at the target finger, and the target finger can be easily and quickly removed and replaced.

As can be readily seen, then, there are numerous advantages provided by the present invention. As mentioned above, it is simple and quick to replace worn or broken fingers. The tube, fingers and spacers can be composed of any material suitable to the particular application. Also, the spacers can be of any length and therefore provide for adjustability, such that fingers can be positioned at any desired spacing.

The foregoing is considered as illustrative only of the principles of the invention. Thus, while certain aspects and embodiments of the invention have been described, these have been presented by way of example only and are not intended to limit the scope of the invention. The scope of the claims should not be limited by the exemplary embodiments set forth in the foregoing, but should be given the broadest interpretation consistent with the specification as a whole.

The invention claimed is:

1. A bat for a harvesting header reel assembly, the bat comprising:

a tube having an elongate open channel therein extending parallel to the long axis of the tube; and a plurality of fingers removably retained in spaced apart positioning in the channel;

wherein the fingers are configured for insertion into the channel in a first orientation and rotatable to a second orientation for retention in the channel; and wherein:

each of the fingers comprises projections on opposite sides of the finger;

the channel comprises flanges extending partially across the channel toward each other; and the projections are configured for slip-fit engagement with the flanges when the finger is rotated into the second orientation.

2. The bat of claim 1 wherein the channel extends substantially the length of the bat.

3. The bat of claim 1 wherein the fingers are composed of molded plastic.

4. The bat of claim 1 further comprising a plurality of spacers configured for removable retention in the channel, wherein the fingers and spacers are removably retained in alternating order in the channel.

5. The bat of claim 4 wherein the spacers are of a selected length.

6. The bat of claim 1 wherein the tube is composed of extruded aluminum.

7. The bat of claim 1 wherein the projections are paired on each side of the finger and spaced apart and define a gap therebetween for receiving each of the flanges.

8. The bat of claim 1 further comprising a plurality of spacers configured for removable retention in the channel, wherein each of the spacers comprises opposed groups for receiving each of the flanges.

9. The bat of claim 1 wherein the channel is open on at least one end of the tube for receiving the fingers therein.

10. A harvesting header comprising a frame and a reel assembly mounted on the frame, the reel assembly comprising a plurality of bats disposed about a central shaft, each of the plurality of bats comprising:

a tube having an elongate open channel therein extending parallel to the long axis of the tube; and a plurality of fingers removably retained in spaced apart positioning in the channel;

wherein the fingers are configured for insertion into the channel in a first orientation and rotatable to a second orientation for retention in the channel;

wherein each of the fingers comprises projections on opposite sides of the finger;

the channel comprises flanges extending partially across the channel toward each other; and the projections are configured for slip-fit engagement with the flanges when the finger is rotated into the second orientation.

11. The bat of claim 10 wherein the channel extends substantially the length of the bat.

12. The bat of claim 10 wherein the fingers are composed of molded plastic.

13. The bat of claim 10 further comprising a plurality of spacers configured for removable retention in the channel, wherein the fingers and spacers are removably retained in alternating order in the channel.

14. The bat of claim 13 wherein the spacers are currently selected length.

15. The bat of claim 10 wherein the tube is composed of extruded aluminum.

16. The bat of claim 10 wherein the projections are paired on each side of the finger and spaced apart and define a gap therebetween for receiving each of the flanges.

17. The bat of claim 10 further comprising a plurality of spacers configured for removable retention in the channel, wherein each of the spacers comprises opposed groups for receiving each of the flanges.

18. The bat of claim 10 wherein the channel is open on at least one end of the tube for receiving the fingers therein.

* * * * *

UNITED STATES PATENT AND TRADEMARK OFFICE
CERTIFICATE OF CORRECTION

PATENT NO. : 8,833,048 B2
APPLICATION NO. : 13/766883
DATED : September 16, 2014
INVENTOR(S) : Honey et al.

It is certified that error appears in the above-identified patent and that said Letters Patent is hereby corrected as shown below:

Title Page

Item (73) Assignee

Change "Honey Bee Manufacturing, Ltd." to --Honey Bee Manufacturing Ltd.--

Signed and Sealed this
Fourteenth Day of April, 2015

Michelle K. Lee
*Director of the United States Patent and Trademark Office*